US005398214A

United States Patent [19]

Dale

[11] Patent Number: 5,398,214

[45] Date of Patent: Mar. 14, 1995

[54] PRESSURE RESPONSIVE CLASP (U)

[75] Inventor: John R. Dale, Willow Grove, Pa.

[73] Assignee: The Unites States of America as represented by the Secretary of the Navy, Washington, D.C.

[21] Appl. No.: 239,703

[22] Filed: Mar. 2, 1981

Related U.S. Application Data

[62] Division of Ser. No. 97,453, Nov. 28, 1979.

[51] Int. Cl.[6] .............................................. G01S 15/00

[52] U.S. Cl. ........................................................ 367/4

[58] Field of Search ........................ 220/281, 260, 322; 367/4; 9/8 R

[56] References Cited

U.S. PATENT DOCUMENTS 3,220,600 11/1965 Wojciechowski et al. ......... 220/281

4,075,725 2/1978 Mar et al. ........................... 367/4 X

*Primary Examiner*—Daniel T. Pihulic

*Attorney, Agent, or Firm*—james V. Tura; Susan E. Verona

[57] ABSTRACT

An underwater acoustic surveillance system for obtaining data related to sound sources of interest in a large geographic area over long periods. A number of acoustic sensors are dropped from an aircraft for placement on the bottom of the sea at known locations. Each sensor automatically deploys a parachute to retard the descent in the air. A parachute riser weak link releases the parachute upon immersion in the water, and a latch operable at a preselected depth allows cylindrical staves to spread apart and form a stable platform on the bottom from which a hydrophone suspends and an acoustic projector tethers. A web-like flow shield unfolds between adjacent staves of the platform to provide additional retardation during the descent in the water and to reduce hydrophone noise due to water currents at the bottom. A water-activated battery at the lower extremity of each stave ensures upright orientation of the sensor when it reaches the bottom, and provides electrical power for storing and transmitting acoustic data. Acoustic data stored in the sensor is retrieved by a sonobuoy deployed on the surface near the previously recorded location of the sensor. An r.f. interrogating signal from the aircraft is acoustically relayed by the sonobuoy to the sensor and acoustic data returned through the same communication media to the aircraft. Thus, large geographical areas may be synoptically monitored for sound sources of interest over long periods and the acoustic data quickly and economically retrieved.

5 Claims, 3 Drawing Sheets

PRESSURE RESPONSIVE CLASP (U)

STATEMENT OF GOVERNMENT INTEREST

The invention described herein may be manufactured and used by or for the Government of the United States of America for governmental purposes without the payment of any royalties thereon or therefor.

CROSS-REFERENCE TO RELATED APPLICATION

This is a division of application Ser. No. 97,453, filed Nov. 28, 1979.

BACKGROUND OF THE INVENTION

The present invention relates to pressure responsive clasps, and more particularly to a clasp suitable for operation with underwater acoustic surveillance systems and ASW (anti-submarine warfare) aircraft for monitoring sound sources in large underwater areas.

Prior art systems for long-term surveillance of underwater areas for the passage of surface and submarine vessels, and other sound sources of interest, generally employ a field of hydrophones laid out at known locations and the detected sounds are retransmitted to a remote land, air or sea station for further processing and analysis. The hydrophones may be suspended from a surface buoy, and the detected sounds re radio transmitted to the aircraft. Such buoys usually experience high ambient noise and self-noise resulting from waves and high water currents, and may drift away from the area of interest. In other systems, the hydrophones are moored to the bottom and connected by cable to a remote shore station or ship. The required cable link severely limits such a system to relatively small geographical areas close to shore or in shallow waters. In addition, deployment and maintenance of the cable is extremely difficult, particularly in high sea states. A more recent proposal utilizes bottom-moored hydrophones which are linked by cable to surface buoys for radio retransmitting the acoustic data. All of these systems, however, require considerable cable for operating in deep ocean and thereby add weight, volume and cost which make them unsuitable for launching in large numbers from an aircraft.

SUMMARY OF THE INVENTION

Accordingly, it is an object of the present invention to provide a pressure responsive clasp for operation with an underwater surveillance platform launched from ASW aircraft, and which will enable underwater surveillance over long periods and at greater depths than are possible with present day systems. Another object is to provide a clasp which extends the monitoring capability to more remote areas of the sea. A still further object is to provide a clasp which can more reliably and precisely deploy a surveillance platform to the bottom of the sea, and which is relatively inexpensive to make and operate.

Briefly, these and other objects of the invention are accomplished by a pressure responsive clasp which retains a deployable surveillance platform in a cylindrical container for launching from an aircraft over water. A parachute immediately deploys for descent in the air. Upon contact with the water, the impact force against the parachute breaks a parachute riser weak link to allow more rapid descent of the container in the water. At a preselected depth, the clasp releases a retaining band for deployment of cylindrical staves which form the lower sides of the container and allows them to open and deploy a hydrophone and an acoustical projector which depend from an electronics assembly in the upper portion of the container. The staves form a tripod platform with a water-activated power supply secured to the base ends and an acoustically transparent flow shield around the hydrophone. The electronics assembly provides continuous listening with minimal battery drain, and selective acoustic data storage and transmission. The emplaced acoustic sensor is interrogated from the aircraft through a sonobuoy deployed at the sensor location with an appropriate code acoustically transmitted from the sonobuoy to the sensor. Acoustic data accumulated in the sensor over an extended time is transmitted together with corresponding time codes to the aircraft via the sonobuoy.

The invention will be better understood from the following description of embodiments of the invention given by way of example with reference to the accompanying drawings wherein:

DESCRIPTION OF THE PREFERRED EMBODIMENT

Figure 1:
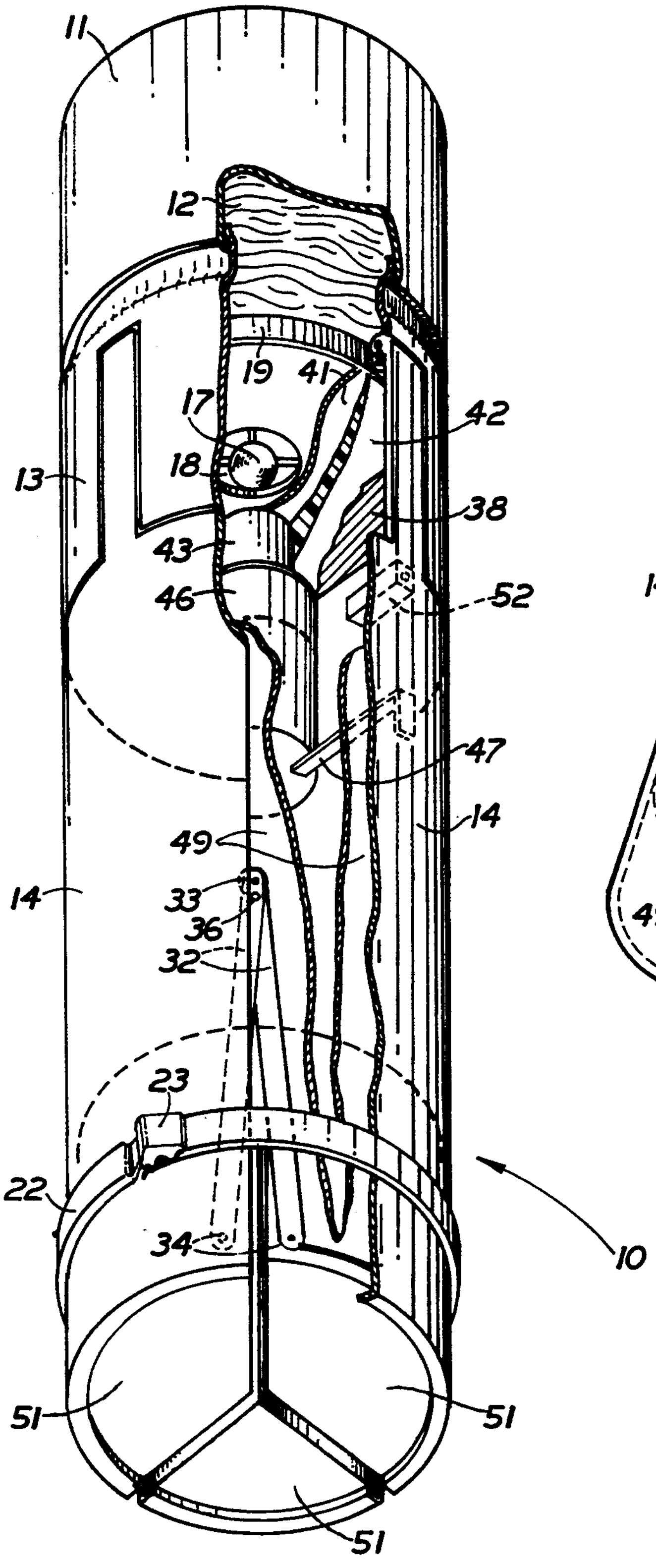
FIG. 1 represents a perspective view of an air droppable, acoustic sensor with a pressure responsive clasp according to the invention in a pre-launch configuration with portions cutaway to illustrate components within.
Figure 8:
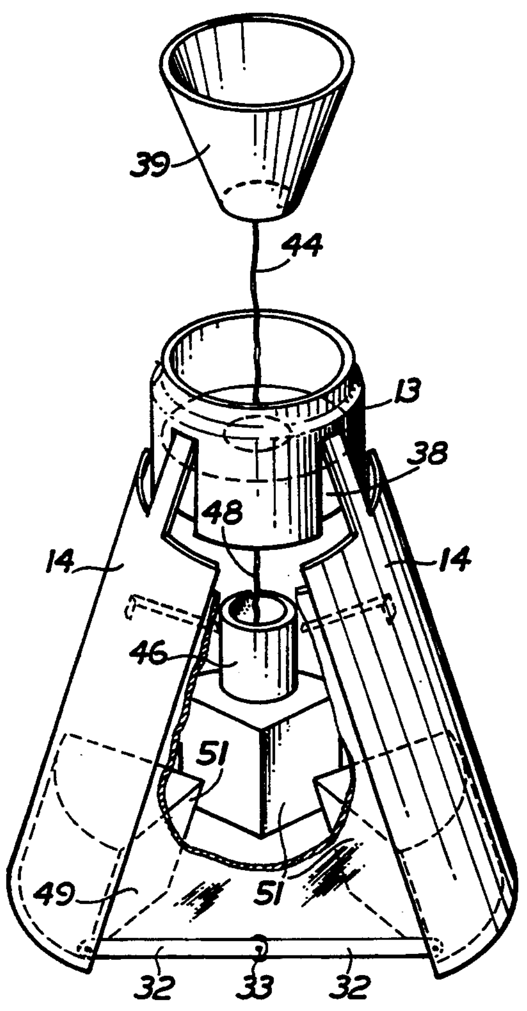
FIG. 8 represents a perspective view of the sensor of FIG. 1 when deployed on the bottom of the sea.

Referring now to the drawings wherein like characters designate like or corresponding parts throughout the several views, there is shown in FIG. 1 an air-droppable acoustic sensor 10 preferably of cylindrical configuration and size suitable for dispensing from a standard ASW aircraft sonobuoy launcher. The cylindrical enclosure of sensor 10 basically comprises a removable end cover 11 containing a parachute 12, an electronics housing 13, and a cylindrical cluster of three staves 14. End cover 11 immediately releases after launch by any conventional mechanism such as a wind flap or squib-activated latch, not shown, and a parachute 12 automatically deploys to retard the sensor during descent in the air.

Figure 2:
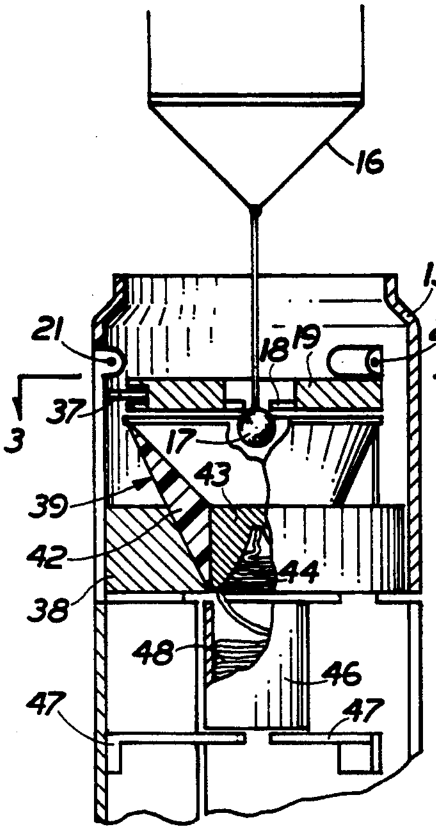
FIG. 2 is a longitudinal cross-section of an upper portion of the sensor of FIG. 1 during retarded descent in the air.
Figure 3:
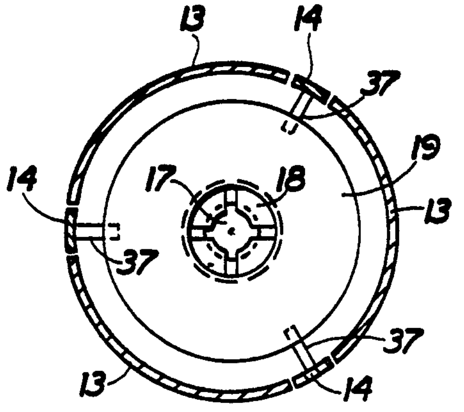
FIG. 3 is a transverse cross-section of the sensor taken along the line 3—3 of FIG. 2.

As illustrated in FIG. 2, parachute riser 16 terminates in a detent ball 17 which is secured in housing 13 on the lower side of a slotted obturator 18 centrally fixed within a retaining disc 19. Obturator 18 is of sufficient strength to resist the upward force of ball 17 due to the opening shock of the parachute, but insufficient to prevent escapement of ball 17 when sensor 10 enters the water and the parachute impacts the water surface. Parachute 12 is thusly jettison upon entering the water.

The staves 14 are pivotally connected at their upper ends by stave pins 21 to housing 13 and are retained in the clustered positioned by a retaining band 22 and clip 23.

Figure 5:
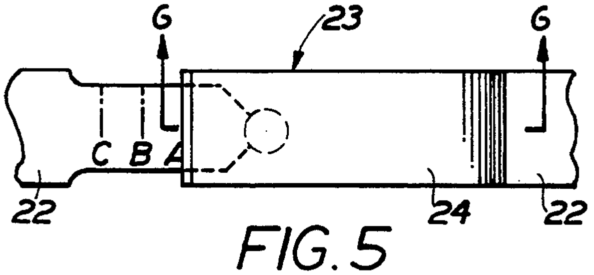
FIG. 5 is an enlarged view of the clasp of FIG. 4.
Figure 6:
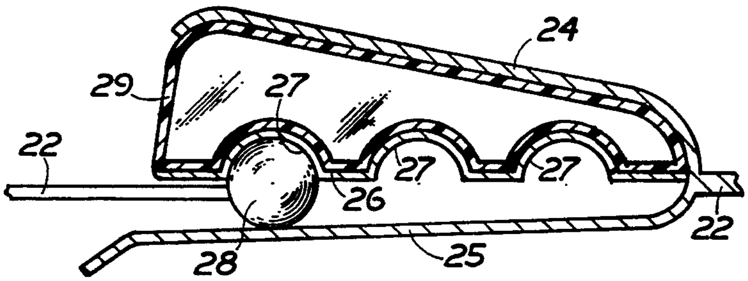
FIG. 6 is an enlarged cross-section view of the clasp taken along the line 6—6 of FIG. 5.
Figure 4:
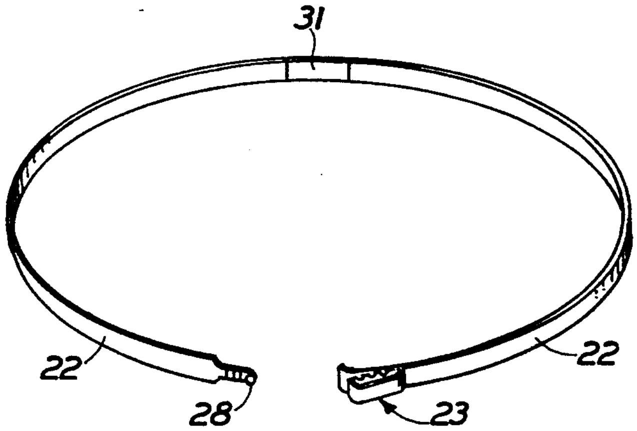
FIG. 4 represents a perspective view of a stave retaining band and clasp of the sensor of FIG. 1.

Staves 14 are automatically released by clasp or retaining clip 23 at a selected depth. As illustrated in FIGS. 5 and 6, clip 23 includes rigid bifurcated members 24 and 25 secured to one end of band 22, and a rigid detent plate 26 therebetween. A pressurized bladder 29 secured to member 24 urges plate 26 toward member 25. A series of spherical indentations 27 are spaced inwardly along the length of plate 26 for positively seating a detent ball 28, secured to the other end of band 22, when inserted between plate 26 and member 25. The indentation 27 selected for seating ball 28 determines the water depth at which clip 23 releases staves 14. That is, as the hydrostatic pressure increases with depth, bladder 29 compresses to unseat ball 28. Incrementally higher pressure is required for release at each inwardly adjacent indentation 27. Calibrated lines A, B and C on band 22 adjacent to ball 28 provide indicia of the indentation 27 receiving ball 28 and the depth at which clip 23 releases. It is preferred that the deepest setting possible be selected to maximize the duration of descent with staves 14 in the closed position. An elastic member 31 interposed along the length of band 22 provides substantially uniform tension at clip 23 regardless of the indentation 27 selected for ball 28.

Upon release of retaining band 22, the lower ends of staves 14 are spread outwardly about stave pins 21 to form a tripod platform by three pairs of spreader struts 32, each strut of a pair being pivotally connected to the other at their one ends by pin 33 and at their other ends to the lower ends of staves pairs. Spreading of staves 14 is initiated by coil springs 36 connected between struts 32 about pin 33 and is augmented by the upward force of the water as the sensor descends.

With staves 14, in the closed position, retaining disc 19 is secured within housing 13 by three studs 37 fixed to and radially extended from the upper ends of staves 14 into corresponding recesses in the periphery of disc 19. Studs 37 fully withdraw from disc 19 when staves 14 spread into the tripod platform.

Housing 13 includes an annular submersible electronic unit 38 with a conical upper surface for supporting a buoyant projector unit 39 against the lower surface of disc 19. The projector unit 39 includes an underwater acoustic projector 41 surrounded on the sides by flotation collar 42, preferably of rigid foam to provide positive buoyancy in water to unit 39. Projector 41 is preferably a conventional ceramic type which is tuned for a high Q at the transmit frequency with a cone designed for high transmission directivity. The lower end of projector unit 39 includes a core section 43 having a flared opening for receiving an electrically conductive tether cable 44. One end of cable 44 is operatively connected to the output of electronic ujit 38, and the other end to a support point inside the flared opening. The support point is along the projector axis at a location where the torques imparted on unit 39 due to horizontal water drag are equalized. In this manner, projector 41 maintains vertical orientation regardless of bottom contours and current flow and ensures substantially vertical directivity in sound propagation.

With staves 14 in the closed position, a hydrophone 46 is also urged against the lower surface of electronics housing 13 by three brackets 47 fixed to respective staves 14 and inwardly extended against the lower surface of hydrophone 43. A recess at the upper end of hydrophone 46 provides for storing an electrically conductive complaint suspension cable 48 which is operatively connected between hydrophone 46 and the input of electronic unit 38. Hydrophone 46 drops freely to the payout length of cable 48 when staves 47 spread into the tripod platform. The compliance of cable 48 reduces self-noise induced by motion in the bottom boundary layer flow field.

An acoustically transparent, flexible flow shield 49 is fixed to staves 14 to form a generally truncated right trihedral enclosure around hydrophone 46 when the staves 14 have formed the tripod platform. The base of shield 49 is adjacent to the spreader struts 32; and the upper edge is separated from submersible housing 13 to allow water to flow through the enclosed area during the descent. In the prelaunch configuration, flow shield 49 is folded within staves 14 as shown in FIG. 1. The hydrophone 46 is suspended in the approximate center of the enclosure to ensure against contact in a non-level bottom or in a soft bottom landing. The effect of shield 49 is to reduce the low frequency selfnoise caused by flow.

The center of gravity of the sensor is substantially below the center of buoyancy when staves 14 are spread into the tripod platform. This is accomplished with three water activated batteries 51 respectively affixed to the lower portion of each stave 14 which become electrically operative upon immersion. The batteries are preferably 120° cylindrical segments occupying the entire volume enclosed by the lower ends of staves 14.

Figure 7:
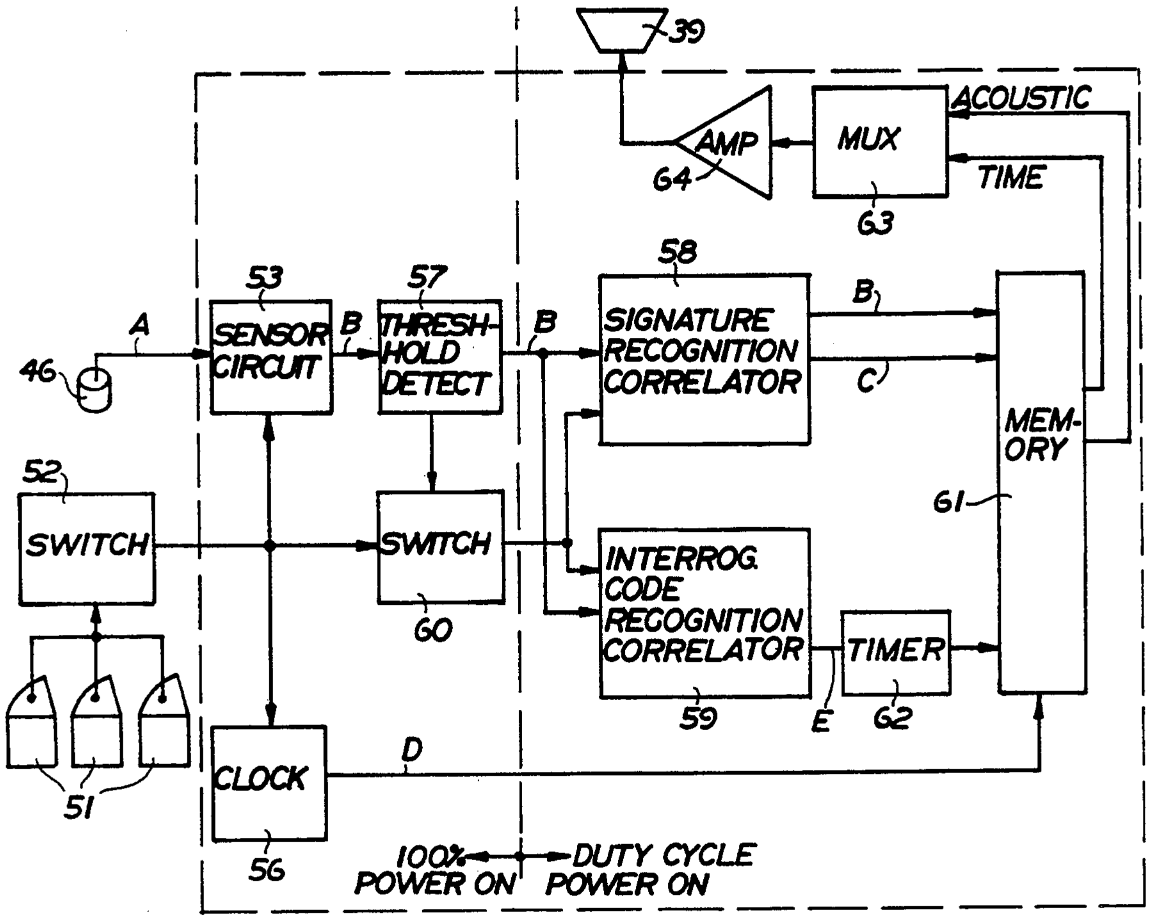
FIG. 7 is a schematic block diagram of the electrical components of the sensor of FIG. 1.

Electronic unit 38 is electrically energized by batteries 51 when the staves spread open through a displacement switch 52 mechanically connected between housing 13 and one of staves 14. Referring to FIG. 7, closure of switch 52 energizes an acoustic sensor 53, threshold detector 57, and time code clock 56. Acoustic signals A generated at hydrophone 46 in response to underwater sounds generated by sources of interest or by an interrogating sonobuoy, and within a predetermined frequency band of interest, are amplified in circuit 53 and transmitted as signal B to a threshold detector 57. If signal B is above a selected level of interest, detector 57 closes switch 60 to energize a signature recognition correlator 58 and an interrogation code correlator 59 and passes signal B to correlator 58 and 59 where its frequency spectrum is compared with the frequency spectra (signatures) of known sound sources stored in correlator 58 and of interrogation codes stored in correlator 59. If signal B is correlated with one of the stored signatures, correlator 58 transmits a WRITE mode signal C and acoustic signal B to memory unit 61 enabling signal B and a time code signal D from clock 56 to be stored. The WRITE mode signal is disabled when the signal B falls below the threshold level or is not recognized.

If the signal B is correlated with a stored interrogation code, correlator 59 transmits a READ mode signal E to a timer 62 which enables memory 61 and produces an output, in compressed time, of the stored signal B and time code signal D. These signals are transmitted through a multiplexer 63 and amplifier 64 to acoustic projector 39. After a period sufficient to enable complete read out of data stored, timer 62 disables memory 61 and the system reverts to the passive listening mode.

The electronic components 53-64 are of conventional design suitable for packaging within the submersible electronic unit 38.

Figure 9:
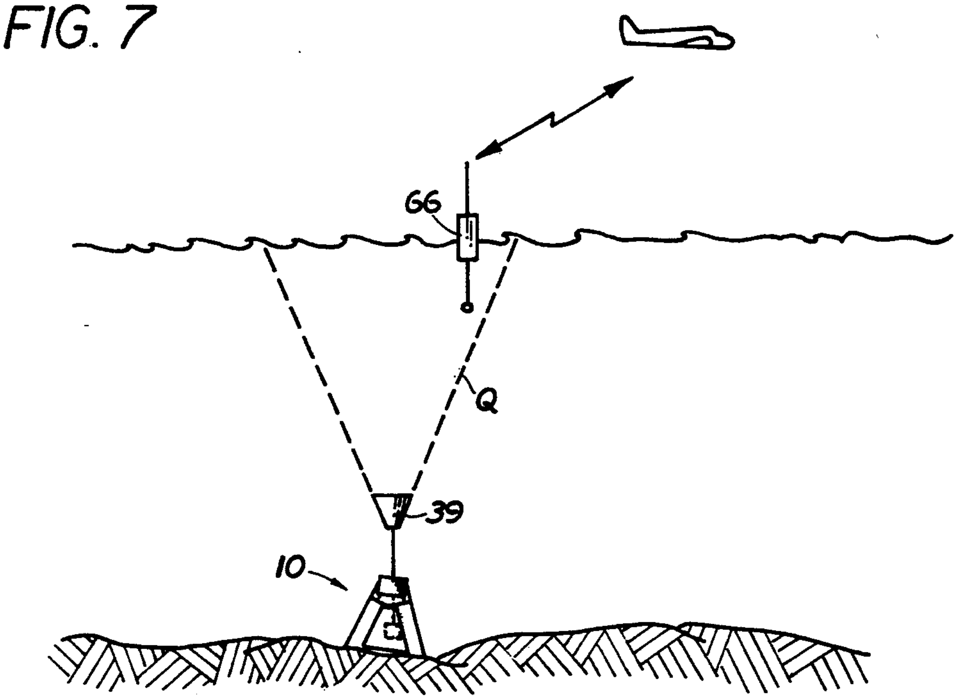
FIG. 9 is an elevation view of the underwater acoustic surveillance system according to the invention when fully operational in a sea area of interest.

Referring now to FIG. 9, sensor 10 is shown operationally deployed at the bottom of the sea with its projector 49 having a conical zone of ensonification Q. An interrogation sonobuoy 66 is placed within the zone for acoustically linking sensor 10 with an aircraft P. An interrogation signal corresponding to an interrogation code stored in correlator 59 is radio transmitted from aircraft P to the sonobuoy where it is transformed into an acoustic signal for transmission through the water to hydrophone 46 in sensor 10. Responsive to the interrogation, any acoustic data stored in sensor 10 are returned via the acoustic-radio link of sonobuoy 66 to aircraft P. Sonobuoy 66 may be of any conventional design having acoustic-r.f. receiving and transmitting capabilities such as the AN/SSQ-71 Air Transportable Acoustic Communication Sonobuoy modified for the required frequency bandwidth and code sequences.

OPERATION

A typical ASW mission starts with information in advance regarding a specific ocean area to be monitored. The information is for storing the frequency spectra (signatures) of sound sources of interest, for setting the release depth of staves 14, and for determining the number of stores required in the mission for the acoustic propagation in the area. An ASW aircraft then flies to the area and drops a number of acoustic sensors 10, noting geographical location at each drop. Upon entering the air stream, parachute cover 11 jettisons and parachute 12 deploys to retard descent in the air. Upon entering the water, parachute 12 separates when the opening shock force transmitted through the riser 16 to detent ball 23 overcomes the resisting force of obturator 18. The sensor 10 then descends in the water at a substantially high constant velocity. External fins are not required for stabilization because of the low center of gravity resulting from locating the heavy components including batteries 51 at the lower end and the lighter components including projector 39 at the upper end.

At the depth selected by the setting of the band retaining clip 23 at indicia A, B or C prior to launch, the retaining band 22 releases and allows staves 14 and flow shield 49 to open under the influence of coil springs 36 and flow shield 49. This slows the sensor down an amount sufficient to allow bottom contact without damage.

When staves 14 open, a switch 52 closes to electrically connect batteries 51, activated during descent, to electronic unit 39. This occurs before the sensor reaches the bottom to allow recordation of a seismic-type signal for surmising the status of the sensor placement. For example, a high frequency signal would suggest that the sensor landed in an upright position on a hard bottom, and a low frequency signal that it landed an upright position on a soft bottom. A sequence of bursts would suggest a rolling contact of questionable emplacement.

As staves 14 open during descent, pins 37 and brackets 47 withdraw to release retaining disc 19, projector 39 and hydrophone 46. The flotation shell 42 causes the projector 39 to tether and the hydrophone to suspend within flow shield 49. Hydrophone cable 48 is preferably compliant to eliminate self-noise that may be induced by motion of the platform in the bottom boundary layer flow field. The hydrophone is approximately centered within flow shield 49 to insure no contact in a non-level soft bottom landing and to allow hydrophone reception at very low acoustic frequencies. Shield 49 further reduces low frequency self-noise at hydrophone 46 due to flow and improves detection because it is equivalent to near field sound (noise) sources which, in effect, decreases with distance. In view of the substantially greater distance obtained than with typical hydrophone shields, significant noise reduction is achieved without degrading target detection. This feature also allows the sensor to be used for direct application in seismic measurements of ocean bottoms.

The sensor 10 is in a "listening" mode with minimal power requirements when it reaches the bottom. The only continuously energized electrical components are the acoustic sensor circuit 53, time code clock 56 and threshold detector 57 which are relatively low energy drains. When detector 57 senses an average voltage level within an acoustic frequency band which is above the threshold value, signature recognition correlator 58 and interrogation code correlator 59 are enabled. Assuming a sound source signal B of a recognized frequency distribution (signature) appears which exceeds the threshold level, correlator 58 produces a signal D which enables the WRITE mode of memory 61 for recording the acoustic data signal C along with time code signal E from clock 56. When signal B decreases below the threshold, controller 58 disables memory 61 and sensor 10 returns to the "listening" mode. It is contemplated that memory 61 have sufficient storage capacity for recording sound sources over an extended period of time, for example, 14 days.

To acquire a synoptic history of significant acoustic data stored in memory 61 since time sensor 10 was deployed, or since the last interrogation, an aircraft P returns to the area and deploys a sonobuoy 66 at the previously recorded location of the sensors 10. Precise placement of sonobuoy 66 is not critical except that its hydrophone should be within the ensonification cone Q of projector 39. An interrogation code is then radio transmitted from the aircraft which corresponds to the unique frequency spectrum (code) stored in interrogation code recognition correlator 59. Sonobuoy 66 acoustically retransmits the code through the water with sufficient signal strength to generate the signal B at the input of correlator 59. It should be noted that other sensors 10, within range of sonobuoy 66, will not respond because of different stored codes for subsequent interrogation.

Upon recognizing the interrogation code, correlator 59 starts READ timer 62 which enables memory 61 for "reading" out in compressed time the stored acoustic data and corresponding time codes to multiplexer 63, amplifier 64 and projector 39. Sonobuoy 66 then provides the acoustic-radio link to aircraft P for utilization of the data pursuant to the mission.

An alternative for enhancing more covert operation, may be obtained by storing in correlator 59 a bio-acoustic signature such as the frequency spectrum of a natural underwater sound source.

Some of the many advantages and novel features of the invention herein disclosed and claimed should now be readily apparent. For example, mission costs are considerably lowered by reducing the aircraft time needed to acoustically monitor a given area. This is possible because the sensor continuously "listens" when the aircraft is not in the area and because of the longer acoustic range capabilities. The system utilizes a relatively inexpensive, standard size expendible acoustic sensor which can be rapidly and precisely placed at the bottom of the sea and which maintains its location for periods longer than conventional and more complex sonobuoys of the moored or long-life type. The sensor is also positioned in a low ambient noise environment and is relatively free from self-noise.

It will be understood that various changes in the details, steps and arrangement of parts, which have been herein described and illustrated in order to explain the nature of the invention, may be made by those skilled in the art within the principle and scope of the invention as expressed in the appended claims.

What is claimed is:

1. A pressure-actuated retainer comprising, in combination:

detent means formed to be attached to one end of a retaining band;

clasp means having bifurcated members formed at the junction end to be attached to the other end of said retaining band, and pressurized bladder means fixed to one of said members having a plurality of recesses spaced from the open end of said members for grilling said detent means against the other of said members;

whereby incrementally higher external pressures applied to said bladder means releases said detent means from respective ones of said recesses.

2. A retainer according to claim 1 wherein said detent means further comprises:

a rigid ball.

3. A retainer according to claim 2 wherein said bifurcated members form a pair of diverging rigid plates with the inner surfaces thereof substantially perpendicular to a single plane.

4. A retainer according to claim 3 wherein said bladder means further comprises:

an elastic bladder contiguously secured along one side to one of the inner surfaces of said diverging plates, and responsive to external pressure for compressing the other side toward said one inner surface; and a detent plate contiguously secured along the other side of said bladder and having a plurality of spherical reliefs spaced along the length thereof for selectively receiving said ball.

5. A retainer according to claim 4 wherein the bladder urges incrementally larger forces against the ball at relief positions closer to the closed end of said members.

* * * * *